United States Patent [19]

Moynihan

[11] Patent Number: 4,625,809
[45] Date of Patent: Dec. 2, 1986

[54] BRIDGE HITCH TYPE FRAME

[76] Inventor: Gary Moynihan, 8100 Moynihan Rd., R.R. 1, Fairfax, Iowa 52228

[21] Appl. No.: 720,418

[22] Filed: Apr. 5, 1985

[51] Int. Cl.$^4$ ............................................. A01B 35/18
[52] U.S. Cl. .................................... 172/178; 172/483; 172/196; 172/776
[58] Field of Search ............... 172/140, 178, 483, 145, 172/443, 142, 484, 677, 471, 776, 413; 111/1

[56] References Cited

U.S. PATENT DOCUMENTS

| | | | |
|---|---|---|---|
| 3,177,828 | 4/1965 | Cramer | 111/52 |
| 3,757,871 | 9/1973 | Maust, Jr. et al. | 172/178 |
| 4,227,581 | 10/1980 | Klotzbach | 172/142 |
| 4,245,706 | 1/1981 | Dietrich, Sr. | 172/180 |
| 4,313,503 | 2/1982 | Good et al. | 172/178 |
| 4,446,924 | 5/1984 | Dietrich, Sr. | 172/178 |
| 4,489,789 | 12/1984 | Pearce | 172/443 |
| 4,522,267 | 6/1985 | Lewison | 172/45 |

*Primary Examiner*—Richard J. Johnson
*Attorney, Agent, or Firm*—Hill, Van Santen, Steadman & Simpson

[57] ABSTRACT

A plow and disc combination machine which utilizes a bridge hitch type frame which is built in the same order as a highway bridge which enables the plow to have clearance so that a disc gang mounted under it and movable by hydraulics can be raised or lowered on the move. The fact that a bridge truss structure is utilized in the frame allows the discs to be movable over a wide vertical range and allows the subsoiler plow shanks to be used in the ground at maximum depth without the usage of the disc blades. The discs can also be lowered to cut material such as corn stalks as the plow is used.

1 Claim, 4 Drawing Figures

BRIDGE HITCH TYPE FRAME

BACKGROUND OF THE INVENTION

1. Field of the Invention

This invention relates in general to plows and disc combination machines and in particular to a novel machine with a bridge hitch type frame.

2. Description of the Prior Art

Disc and plow machines such as disclosed in U.S. Pat. Nos. 3,757,871, 4,313,503 and 4,245,706 and 4,446,924 disclose combination disc and plow machines, but such machines have frames that are straight or if they have a disc gang they can only raise them up and down a few inches.

SUMMARY OF THE INVENTION

The present invention comprises a farm machine having a plurality of subsoiler shanks that can be set into the ground at a maximum depth either with or without the use of disc blades and which uses a bridge trust type frame which provides adequate strength for the machine and also allows a substantial vertical adjustment of disc blades relative to the machine so that the disc blades can either be completely raised above the soil so that they do not engage it or, alternatively, can be set to any desired depth so as to engage and cut up debris such as corn stalks and trash. The present invention has the advantages that there is decreased plugging and when the tool is used on one pass tillage if the ground happens to be rolling with small hills the subsoiler shanks can be lifted out of the ground and the disc gang can be lowered so that it is cutting trash without plugging. This saves wear and tear on the tractor and prevents shifting of gears and wasting of time when plowing over hills. The invention also provides independent depth control. The machine has a V-shaped structure which makes it easier to pull. The machine provides V chisels with shanks whereas conventional chisel plows whether it has colters or disc blades just use twisted shovels to flip soil on top of trash and make ridges. Such standard chisel plows are not comparable to a V chisel. A V chisel runs deeper and breaks up hard pan to allow water penetration and root growth. Prior Art chisel plows with twisted shanks may go into the ground 0-8 inches whereas a V chisel subsoiler can be inserted into ground from 0-20 inches.

It is an object of the present invention to provide an improved farm machine which has a bridge hitch type frame which allows substantial independent adjustment of the plow or discs mounted on the machine.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 4 is a side plan view illustrating the bridge hitch type frame of the invention.

DESCRIPTION OF THE PREFERRED EMBODIMENTS

Figure 1:
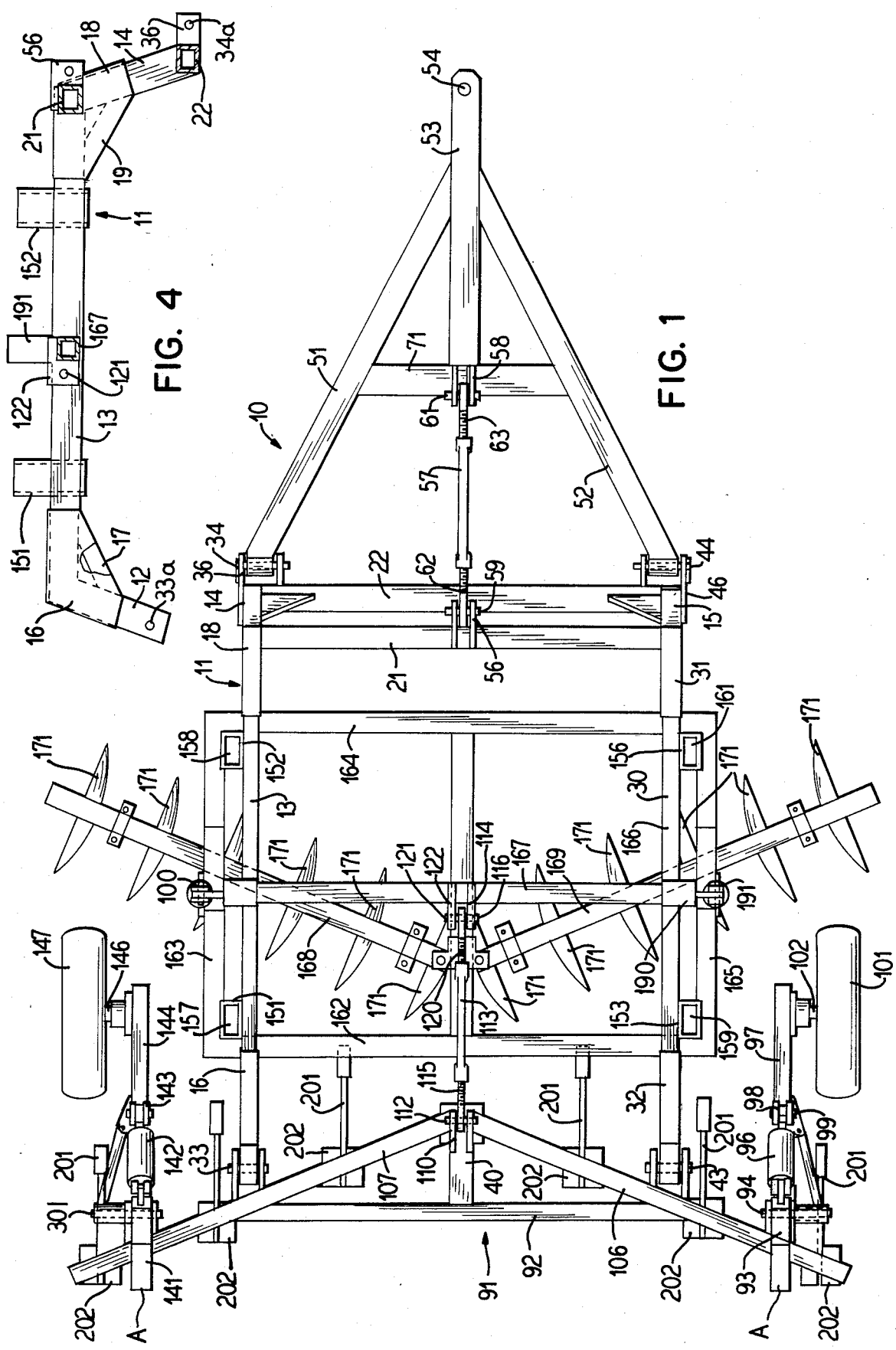
FIG. 1 is a top plan view of the farm machine of the invention.
Figure 2:
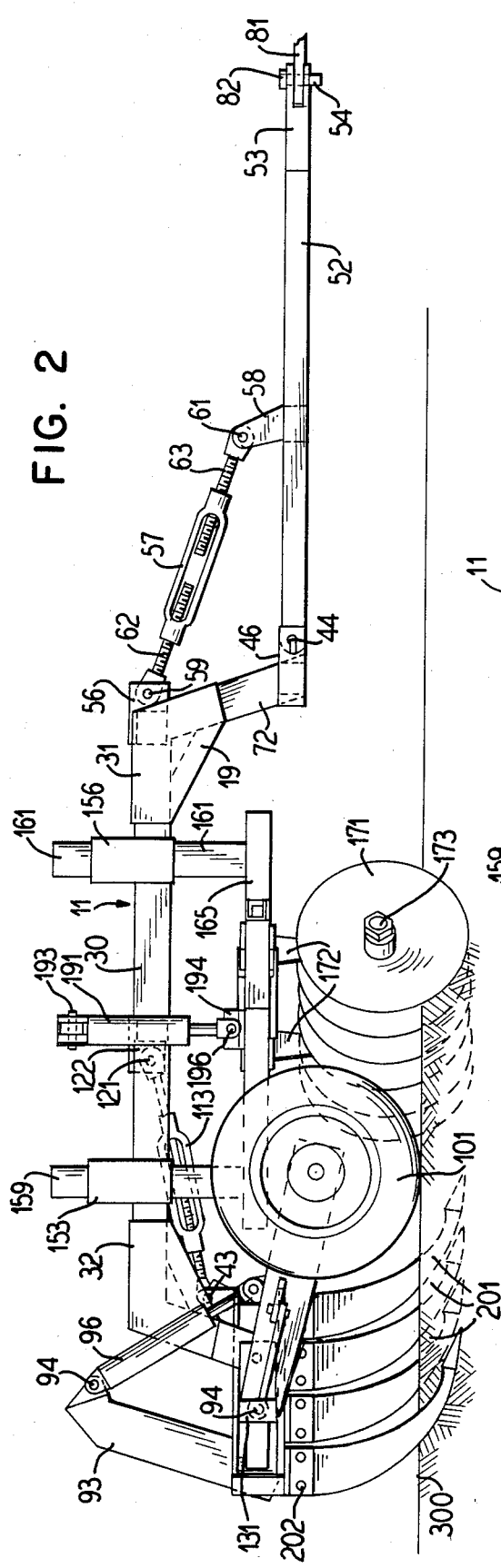
FIG. 2 is a side plan view of the invention.

The farm machinery of the present invention comprises a bridge hitch type frame 11 comprising a pair of longitudinal frame members 13 and 30 which are connected together by cross-brace members 21 and 167. As illustrated in FIG. 4 the longitudinal extending frame members 13 and 30 are connected to downwardly extending legs 12 and 14 by reinforcing cover and brace members 16 and 18 and cross-braces 17 and 19. A cross-member 22 extends between the lower ends of the brace members 14 which are attached to members 13 and 30. A draw bar member 10 comprises V-shaped members 51 and 52 which join together at a draw bar member 53 which has an opening 54 through which a pin 82 can be inserted to connect the machine to the draw bar 81 of a tractor as illustrated in FIG. 2. A cross frame member 71 extends between the members 51 and 52 and the rear ends relative to FIG. 1 of members 51 and 52 are formed with openings through which connecting pins 34 and 44 are received. The pins 34 and 44 also extend through brackets 36 and 46 connected to lower ends of 14 and 15 of the frame members 13 and 30. A bracket 56 is connected to member 21 which is a cross-brace member of the frame member and is formed with an opening through which a pin 59 extends to attach a threaded eye bolt 62 to the bracket 56. A turn buckle 57 is threaded on the eye bolt 62 and has its opposite end threadedly connected to an eye bolt 63 which is connected to a bracket 58 by pin 61 on cross-brace 71 so as to allow adjustment of the draw bar structure comprising the members 51, 52 and 53 relative to the frame 11.

A plow supporting frame 91 is pivotally attached to the rear end of the frame member 11 by pivot pins 33 and 44 which extend through openings in the lower end of frame members 16 and 32. A cross-member 92 extends between V-shaped frame members 106 and 107 and a supporting member 40 extends from the member 92 to the ends of members 106 and 107 as shown in FIG. 1 and a bracket 110 receives a pivot pin 112 which extends through an eye bolt 115 of a turn buckle 113. The turn buckle 113 is also threadedly connected to an eye bolt 120 which is connected by pivot pin 121 to a bracket 122 mounted on frame member 11. A plurality of plows 201 are connected to the frame member 91 by mounting brackets 202 as shown. A pair of ground wheels 101 and 147 are pivotally connected to the plow supporting structure 91 by pivot pins 94 and 301 which are connected to brackets 93 and 141 of the plow supporting frame 91. The ground wheel 101 is mounted on a shaft 102 which is connected to a link 97 at one end and which has its opposite end connected to the frame member 91 by the pivot pin 94. Likewise, ground wheel 147 is mounted on axle 146 and is connected to linkage 144 which has its other end connected to pivot pin 301 which is connected to the frame 91. A hydraulic cylinder 96 has one end connected to the linkage 97 by pivot pin 99 and bracket 98 and its other end is connected to an extending arm 93 which is mounted on the frame 91 by a pivot pin 94. A hydraulic cylinder 142 is connected by pivot pin 143 to the linkage 144 and has its other end connected to upwardly extending frame member 141.

A disc carrying frame comprises members 162, 163, 164 and 165 which form a rectangular structure as illustrated in FIG. 1 and has four upright guide members 157, 158, 159 and 161 which extend upwardly from the corners thereof and are received in guide ways 151, 152, 153 and 156 which are mounted on the frame 13 as illustrated. A pair of hydraulic cylinders are mounted so as to move the disc frame 162, 163, 164, 165 vertically with the hydraulic cylinder 191 having a first end connected by pivot pin 196 to a bracket 194 mounted on frame 165. The upper end of the cylinder is connected by pivot pin 193 to a bracket 190 mounted on the frame member 30. A second cylinder 100 is connected between the disc supporting frame 163 and the frame member 13 so as to raise the disc structure. The disc frame 162, 163, 164 and 165 has a pair of disc supporting members 168 and 169 which are mounted in a V-fashion to the underside of the frame members and the members 168 and 169 are formed with downwardly extending frame members 172 which rotatably support on pivots 173 discs 171 as illustrated for example in FIGS. 2 and 3.

In operation, the turn buckles 57 and 113 are set to establish the correct angle of the drawbar 52 relative to the frame structure and the correct relationship of the frame member 91 relative to the frame member 11. Then the wheel controlling cylinders 96 and 142 are actuated so as to lift the wheels 147 and 101 to the position illustrated in FIG. 2. This allows the plows 201 to go into the ground 300 and the wheels 101 and 147 will ride on the surface of the ground. The disc 171 can be adjusted to cut into the ground as illustrated in FIG. 2 by utilizing the hydraulic cylinders 191 and 100. Alternatively, the disc 171 can be raised above the ground level by actuating the cylinders 100 and 191 to lift them out of contact with the ground.

Figure 3:
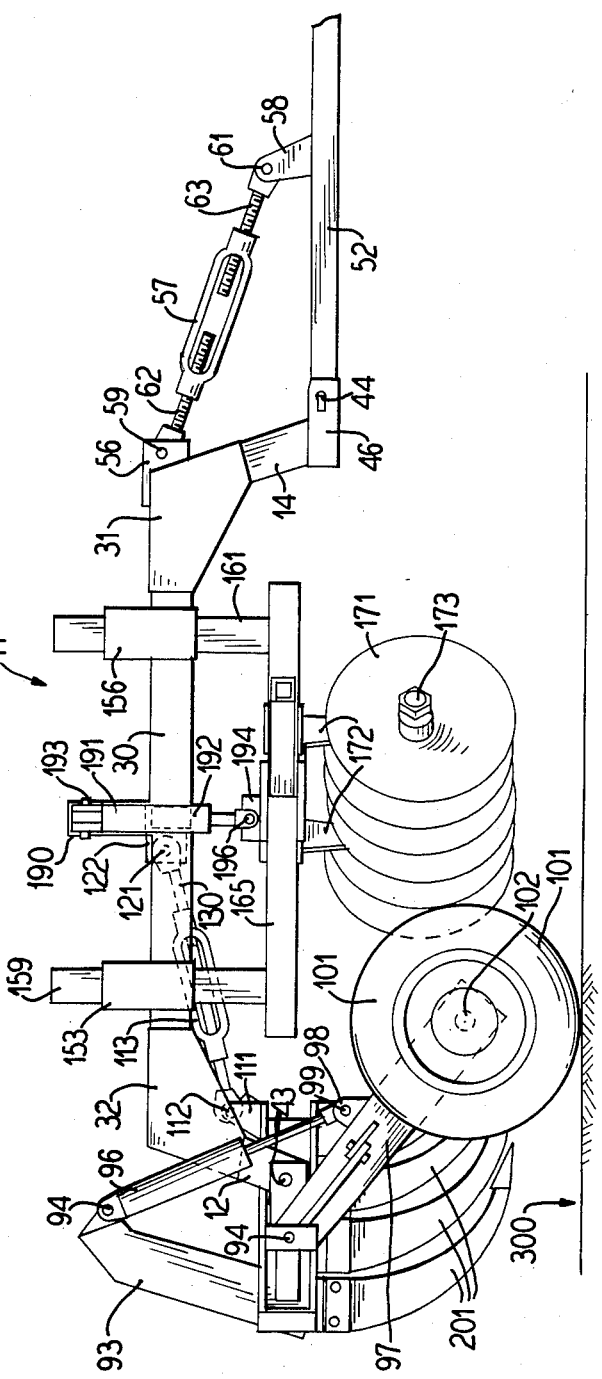
FIG. 3 is a side plan view illustrating the ground wheels lowered so as to lift the plows and discs off of the ground.

When moving the machine, the cylinders 96 and 142 are energized to pivot the wheels 101 and 147 to the position illustrated in FIG. 3 thus raising the plows 201 out of the ground as well as the disc 171 off of the ground. By adjusting the position of the wheels 101 and 147 to different selected positions various operating conditions can be selected for the farm machine.

It is to be noted that the bridge hitch type frame 11 allows the discs 171 with its associated frame and support to be independently adjusted relative to the plows 201 and the ground wheels 101 and 147. Furthermore, such adjustment can be made over a substantial vertical distance so as to select various positions for different plowing conditions as desired.

The bridge hitch type frame 11 comprises a strong and rigid structure then the machine is capable of hard usage over long periods of time without breakdown or maintenance.

It is seen that this invention provides a novel bridge hitch type frame farm machine and although it has been described with respect to preferred embodiments it is not to be so limited as changes and modifications may be made therein which are within the full intended scope of the invention as defined by the appended claims.

I claim as my invention:

1. A farm implement comprising, a bridge truss type frame comprising a pair of longitudinally extending frame members, four downwardly extending frame members attached to opposite ends of said pair of longitudinally extending frame members, a plurality of cross-frame member attached between said pair of longitudinally extending frame members, a draw-bar attached to the front two of said four downwardly extending frame members, a chisel plow supporting cross-frame with a plurality of plows attached to the rear two of said four downwardly extending frame members and mounted substantially under said rear two downwardly extending frame members, a pair of ground wheel supporting links pivotally attached to said plow supporting cross-frame, means for moving said ground wheel supporting links, a disc frame with a plurality of discs supported from said bridge truss frame for vertical movement, and means to raise and lower said disc frame, wherein said draw bar is pivotally attached to said front two of said four downwardly extending frame members, said first locking and adjusting means connected to said draw bar and to said bridge truss type frame, wherein said first locking and adjusting means is a turnbuckle and a pair of I-bolts, wherein said chisel plow supporting cross-frame is pivotally attached to the rear of said four downwardly extending frame members and second locking and adjusting means connected to said chisel plow supporting cross-frame and to said bridge truss type frame, wherein said second locking and adjusting means is a second turnbuckle and a second pair of I-bolts, wherein said means for moving said ground wheel supporting links comprise a first pair of hydraulic cylinders, and wherein said means to raise and lower said disc frame comprise a second pair of hydraulic cylinders.

* * * * *